United States Patent [19]

Reed et al.

[11] Patent Number: 5,270,061
[45] Date of Patent: Dec. 14, 1993

[54] DUAL COMPOSITION HARD COATED GUM WITH IMPROVED SHELF LIFE

[75] Inventors: Michael A. Reed, Evanston; Ulesses P. Orr, Chicago, both of Ill.

[73] Assignee: Wm. Wrigley Jr. Company, Chicago, Ill.

[21] Appl. No.: 857,577

[22] Filed: Mar. 26, 1992

[51] Int. Cl.$^5$ .............................................. A23G 3/30
[52] U.S. Cl. ........................................ 426/5; 426/303; 426/548; 426/804
[58] Field of Search ........................................ 426/3-6, 426/548, 804, 303

[56] References Cited

U.S. PATENT DOCUMENTS

| | | | |
|---|---|---|---|
| 4,105,801 | 8/1978 | Dogliotti | 426/99 |
| 4,117,173 | 9/1978 | Schiweck et al. | 426/548 |
| 4,127,677 | 11/1978 | Fronczowski et al. | 426/5 |
| 4,146,653 | 3/1979 | Mader et al. | 427/3 |
| 4,317,838 | 3/1982 | Cherukuri et al. | 426/5 |
| 4,323,588 | 4/1982 | Vink et al. | 426/564 |
| 4,359,531 | 11/1982 | Bucke et al. | 435/97 |
| 4,423,086 | 12/1983 | Devos et al. | 427/3 |
| 4,587,119 | 5/1986 | Bucke et al. | 424/48 |
| 4,681,766 | 7/1987 | Huzinec et al. | 426/5 |
| 4,786,511 | 11/1988 | Huzinec et al. | 426/5 |
| 4,792,453 | 12/1988 | Reed et al. | 426/5 |
| 4,828,845 | 5/1989 | Zamudio-Tena et al. | 426/5 |
| 4,931,294 | 6/1990 | Yatka et al. | 426/3 |
| 4,961,935 | 10/1990 | Cherukuri et al. | 426/3 |
| 4,976,972 | 12/1990 | Patel et al. | 426/3 |

FOREIGN PATENT DOCUMENTS

| | | |
|---|---|---|
| 24596 | 6/1989 | Australia . |
| 0328849 | 8/1989 | European Pat. Off. . |
| 89/03170 | 4/1989 | PCT Int'l Appl. . |
| 90/06061 | 6/1990 | PCT Int'l Appl. . |
| 90/07864 | 7/1990 | PCT Int'l Appl. . |
| 90/13994 | 11/1990 | PCT Int'l Appl. . |
| 91/03147 | 3/1991 | PCT Int'l Appl. . |

OTHER PUBLICATIONS

U.S. patent application Ser. No. 07/855,251, filed Mar. 23, 1992, by Michael A. Reed and Jeffrey S. Hook, entitled Hard Coated Gum with Improved Shelf Life.
Palatinit®-INFOPAC, about 100 pages (pagination irregular), Palatinit Sussungsmittel GmbH; undated, but believed to have been published about Apr. 1985.
Palatinit® Coating Literature, pp. 73-76, Palatinit Sussungsmittel GmbH; undated, but believed to have been published about Jul. 1987.

Primary Examiner—Jeanette Hunter
Attorney, Agent, or Firm—Willian Brinks Olds Hofer Gilson & Lione

[57] ABSTRACT

A dual composition hard coated chewing gum is provided which exhibits improved long-term shelf stability under storage conditions involving constant exposure to the moisture contained in the atmosphere. The dual composition hard coated chewing gum is ideally suited for pellet chewing gum having pellet shapes which cannot easily be protected from atmospheric moisture by packaging. The dual composition hard coated chewing gum has a gum center which includes a gum base, a bulk portion, and one or more flavoring agents. The dual composition hard coated chewing gum also has an outer coating which includes layers which contain from about 50 to about 100% xylitol; and layers which contain from about 50 to about 100% hydrogenated isomaltulose. A method of preparing the dual composition hard coated chewing gum is also provided.

27 Claims, No Drawings 5,270,061

DUAL COMPOSITION HARD COATED GUM WITH IMPROVED SHELF LIFE

FIELD OF THE INVENTION

This invention relates to a hard-coated chewing gum having an extended shelf life.

BACKGROUND OF THE INVENTION

This invention relates to a dual composition hard-coated chewing gum, i.e., a hard-coated chewing gum in which the hard coating is composed of two components, each having its own composition. More particularly, this invention relates to such a chewing gum having an improved coating quality and extended shelf life.

Specifically, this invention relates to a chewing gum in pellet form, having one or more sequentially added coats of xylitol and hydrogenated isomaltulose. The hard pellets are prepared by coating a gum core with syrups, which include xylitol and hydrogenated isomaltulose. The coated gum has improved coating quality and longer shelf life.

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use in chewing gum. Sugarless coatings which have been investigated include coatings containing compounds such as xylitol, sorbitol, mannitol, and hydrogenated starch hydrolysates.

U.S. Pat. No. 4,792,453, issued Dec. 20, 1988, to Michael A. Reed et al., discloses a chewing gum having a sugarless chewing gum center coated with a syrup containing hydrogenated isomaltulose. The sugarless center may include various constituents such as water, an insoluble gum base, a bulking agent, a softener, an artificial sweetener, and a flavoring agent. The sugarless chewing gum center of the reference has a water content of less than about 2.5 weight percent, preferably less than about 1.5 weight percent and most preferably less than about 1.0 weight percent. The use of a center having a low water content, is intended to prevent or reduce the tendency of the gum center from being a water donor to the hard coating.

Sugarless gums coated with hydrogenated isomaltulose-containing syrup possess excellent appearance, taste, texture, mouth feel, and other desirable properties of hard coated chewing gums. Also, it has been found that the relatively anhydrous gum center has the capability of pulling moisture from the hydrogenated isomaltulose-containing coating, causing the coating to exhibit superior hardness. This moisture-pulling from the gum center is attributable, in large part, to the use of glycerin as a softener in the gum center. The moisture-pulling effect is the most pronounced in hard coated chewing gums which contain moderate or relatively high amounts of glycerin in the chewing gum center, on the order of from about 5 to about 15 percent by weight of the chewing gum center.

The tendency of glycerin to pull moisture from the hydrogenated isomaltulose-containing coating can operate as a disadvantage in certain pellet-shaped hard coated chewing gums which, due to their shape, are difficult to isolate from a moisture-containing environment by packaging. For example, pellet gum which is shaped like pillows is difficult to protect from moisture because it is difficult to form a good quality, low or non-moisture permeable package which is suitable for these pellets.

Hydrogenated isomaltulose is a monohydrate. If the hydrogenated isomaltulose-containing coating on the pellet gum becomes too dry, e.g. due to the presence of glycerin, the coating becomes more hygroscopic and begins to absorb moisture from the surrounding atmosphere. This continuous drying and absorption of moisture from the atmosphere, reduces the shelf life of the pellet gum by causing the coating to soften and lose its desirable texture, appearance and mouth feel. Thus, the coating itself must be sufficiently shelf stable against moisture absorption so as not to allow the coating to deteriorate during its shelf life.

Commonly assigned U.S. patent application Ser. No. 07/855,251, filed Mar. 23, 1992, by Michael A. Reed and Jeffrey S Hook, entitled HARD COATED GUM WITH IMPROVED SHELF LIFE, discloses a chewing gum in pellet form which includes a center portion and an outer coating which contains hydrogenated isomaltulose.

Coating with xylitol is described in U.S. Pat. Nos. 4,105,801, issued Aug. 8, 1978, to Dogliotti; 4,127,677, issued Nov. 28, 1978, to Fronczowski et al.; 4,146,653, issued Mar. 27, 1979, to Mader et al.; 4,681,766, issued Jul. 21, 1987, to Huzinec et al.; 4,786,511, issued Nov. 22, 1988, also to Huzinec et al.; and 4,828,845, issued May 9, 1989, to Zamudio-Tena et al.

SUMMARY OF THE INVENTION

This invention is directed to a dual composition hard-coated chewing gum suitable for use in pellet chewing gum, whose pellet shape does not lend itself to packaging of a type that would protect the pellets from atmospheric moisture.

Chewing gum pellets are subject to constant exposure to atmospheric moisture during shelf storage. The present invention provides a dual composition hard-coated chewing gum which gives improved coating quality and is shelf stable under these conditions.

The chewing gum of the invention includes a center portion and an dual composition outer coating. The outer coating consists of layers having two compositions. One layer composition is all or primarily xylitol; and the other is all or primarily hydrogenated isomaltulose.

The outer coating preferably contains from about 50 to about 100 weight percent xylitol and hydrogenated isomaltulose. The outer coating may also include sweeteners, whiteners, colorants, coating adjuvants and flavors.

The total weight of the coating constitutes from about 10 to about 65 weight percent of the coated chewing gum product.

Any conventional chewing gum center formulation may be used for the gum center. Preferably, however, the gum center is sugarless and includes sorbitol, mannitol, xylitol, maltitol and/or hydrogenated starch hydrolyzate, and an aqueous sorbitol liquid. The gum center constitutes from about 35 to about 90 weight percent of the chewing gum product.

With the foregoing in mind, it is a feature and advantage of the invention to provide a dual composition hard coated chewing gum which retains its hardness, texture, appearance and mouth feel during shelf storage which involves constant exposure to the atmosphere.

It is also a feature and advantage of the invention to provide a dual composition hard coated shelf-stable chewing gum which does not absorb significant quantities of moisture from the atmosphere.

It is also a feature and advantage of the invention to provide a dual composition hard coated shelf-stable chewing gum which is uniquely suitable for pellet gum having pellet shapes which do not lend themselves readily to protective packaging with respect to the atmosphere.

It is also a feature and advantage of the invention to provide a method of making the improved dual composition hard coated shelf-stable chewing gum of the invention.

The foregoing and other features and advantages of the invention will become further apparent from the following detailed description. The detailed description is to be construed as illustrative rather than limitative, with the scope of the invention being defined by the appended claims and equivalents thereof.

DETAILED DESCRIPTION

In accordance with the invention, a dual composition hard coated chewing gum is provided which has a dual composition hard outer coating and a softer chewing gum center portion.

As noted in U.S. Pat. Nos. 4,105,801; 4,127,677; 4,146,653; 4,681,766; 4,786,511; and 4,828,845, referred to above, xylitol, a polyol sugar substitute, can be used to coat various types of products, including chewing gum. Xylitol makes a quality coating for chewing gum, and a number of xylitol chewing gum products are currently on the market in the United States and Europe. Although the quality of product is good using a xylitol coating, the cost is very high for xylitol.

Hydrogenated isomaltulose (e.g., Palatinit ® hydrogenated isomaltulose) is another polyol sugar substitute that can be used in coating as disclosed in Reed et al. U.S. Pat. No. 4,792,453 and the aforementioned Reed et al. application Ser. No. 07/855,251, but the cost of this material is about half as much as xylitol.

By combining a xylitol coating and a hydrogenated isomaltulose coating in this invention, the cost of coating with xylitol can be significantly reduced, while still maintaining some of the advantages of xylitol. Also, by coating a chewing gum pellet with layers of both xylitol and hydrogenated isomaltulose, hydrogenated isomaltulose can give a significant shelf life improvement to the pellet gum. Since hydrogenated isomaltulose is less hygroscopic than xylitol, moisture absorption of the pellet may be reduced, giving extended shelf life to the product in unfavorable storage conditions and packaging problems.

The invention involves first preparing a soft (by comparison to the coating which is to follow) chewing gum center portion, and forming it into gum pellets by conventional means. The pelletized chewing gum centers are then coated with one or more sequentially applied layers of xylitol and hydrogenated isomaltulose coatings.

The xylitol coating may be accomplished in a traditional manner as disclosed by one of the aforementioned U.S. Pat. Nos. 4,105,801; 4,127,677; 4,146,653; 4,681,766; 4,786,511; and 4,828,845. A preferred coating process, applicable to xylitol or hydrogenated isomaltulose, is described below.

The preferred coating process uses a solution of the material to be applied. The xylitol solution used for coating xylitol should contain from about 50% xylitol solids up to the saturation point of xylitol in the solvent, which is about 85% xylitol solids in the case of a water solvent, and preferably from about 60 to about 75 weight percent xylitol solids. The hydrogenated isomaltulose solution used for coating hydrogenated isomaltulose should contain from about 50% hydrogenated isomaltulose solids up to the saturation point of hydrogenated isomaltulose in the solvent, which is about 80% hydrogenated isomaltulose solids in the case of a water solvent, and preferably from about 60 to about 75 weight percent hydrogenated isomaltulose solids. The syrups may comprise xylitol or hydrogenated isomaltulose dissolved in water or any other food quality solvent in an amount sufficient to yield a hard coating comprising from about 50 to about 100 weight percent xylitol or hydrogenated isomaltulose. More preferably, however, the syrup will comprise an amount of xylitol or hydrogenated isomaltulose sufficient to yield a hard coating comprising greater than about 90 weight percent xylitol or hydrogenated isomaltulose. Furthermore, the syrups and thus the layers of coating may contain both xylitol and hydrogenated isomaltulose, and they may contain other sugar substitutes such as sorbitol and mannitol.

Each coating step adds a small amount of xylitol, depending on various factors including chiefly the concentration of the xylitol or hydrogenated isomaltulose in the coating syrup. Each individual coating step adds roughly 1% to the then-current weight of the pellet being coated.

The total amount of these xylitol and hydrogenated isomaltulose coatings may be from about 10% to about 65% by weight of the product obtained by the series of coatings, i.e., after the last coating step, the product contains from about 10% to about 65% xylitol and hydrogenated isomaltulose; and from about 35% to about 90% gum center, by weight of the total product. Reaching this weight of coating will typically require from about 10 to about 65 individual coating steps. A preferred product contains from about 20% to about 50% by weight of combined xylitol and hydrogenated isomaltulose coating, and from about 50 to about 80% gum center.

It is preferred that the layers of xylitol be applied first, and after the xylitol coatings are completed, coatings of hydrogenated isomaltulose be applied in a similar fashion over the xylitol coatings.

The ratio of hydrogenated isomaltulose to xylitol in the coatings may vary widely, but the ratio is preferably about 1:1.

The dual composition hard outer coating includes layers of xylitol and hydrogenated isomaltulose coatings. Each of the two components of the dual composition hard outer coating (i.e., the xylitol component and the hydrogenated isomaltulose component) may be present as a single layer or as a plurality of layers. The dual composition hard coating may be present in any thickness or amount which is commercially acceptable.

Xylitol is a pentahydric alcohol having the empirical formula $C_5H_{12}O_5$, and a molecular weight of 152.15. Its structural formula is

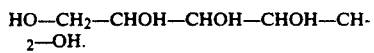

Xylitol is a crystalline compound. Its stabile solid form melts at 93°-94.5° C.; the metastable form melts at 61°-61.5° C. The solubility in water of the stabile form is 64.2 grams per 100 grams of solution at room temperature. Its relative sweetness is about 90% of that of sucrose. It is readily digested and is easily metabolized by diabetics. It is commonly used as an oral and intravenous nutrient, as a dietary additive, and in anticaries preparations.

Hydrogenated isomaltulose, also known as isomalt, is a sugar substitute which can be used in place of sucrose, glucose or similar sugars for the production of foodstuffs. Hydrogenated isomaltulose may be classified as a carbohydrate and, more specifically, a hydrogenated disaccharide. Hydrogenated isomaltulose is believed to be a superior sugarless sweetener in a gum hard coating because of its relatively high sweetening power, lack of aftertaste, and synergistic capabilities when mixed with other sugar alcohols such as xylitol or sorbitol.

Hydrogenated isomaltulose is available from Palatinit GmbH under the trademark Palatinit ®. According to the manufacturer, the production of hydrogenated isomaltulose involves an enzymatic rearrangement of saccharose into a much more stable compound known as isomaltulose (also known as palatinose). Following a purifying crystallization, the isomaltulose is hydrogenated to form hydrogenated isomaltulose. Specifically, Palatinit ® hydrogenated isomaltulose is an equimolar mixture of the isomers α-D-glucopyranosido-1,6-mannitol (GPM) and α-D-glucopyranosido-1,6-glucitol (GPG). Palatinit ® hydrogenated isomaltulose is described as an odorless, white, crystalline, nonhygroscopic substance containing about 5 percent water of crystallization.

Either the xylitol component, the hydrogenated isomaltulose component, or both components of the coating, may also contain other ingredients such as flavoring agents, artificial sweeteners and dispersing agents, coloring agents, film formers, and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain from about 0.2 to about 1.2 weight percent flavoring agent and preferably from about 0.7 to about 1.0 weight percent flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05 to about 0.3 weight percent and preferably from about 0.10 to about 0.15 weight percent artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1 to about 1.0 weight percent and preferably from about 0.3 to about 0.6 weight percent of the agent.

Coloring agents are preferably added directly to the syrup in the dye or lake form. Coloring agents contemplated by the present invention include food quality dyes. Film formers preferably added to the syrup, include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, alginate, cellulosics, vegetable gums and the like.

The softer chewing gum center includes a water soluble bulk portion, a generally water insoluble chewing gum base and one or more flavoring agents. The water soluble portion dissipates over a period of time during chewing, while the gum base portion remains in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate, ester gums and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes from about 5 to about 95% by weight of the chewing gum center, more typically from about 10 to about 50% by weight of the chewing gum center, and most commonly from about 25 to about 35% by weight of the chewing gum center.

The water soluble portion of the chewing gum center may include softeners, bulk sweeteners, high intensity sweeteners, flavoring agents and combinations thereof. Softeners such as glycerin are added to the chewing gum center in order to optimize the chewability and mouth feel of the gum. The softeners, which are also known as plasticizers or plasticizing agents, constitute from about 0.5 to about 15% by weight of the chewing gum center.

Aqueous sweetener solutions such as those containing sorbitol, hydrogenated starch hydrolysates, syrups of xylitol, maltitol, hydrogenated isomaltulose and other polyols, corn syrup and combinations thereof, may also be used as softeners and binding agents in the chewing gum center.

Bulk sweeteners constitute from about 5 to about 90% by weight of the chewing gum center, more typically from about 20 to about 80% by weight of the chewing gum center and most commonly from about 30 to about 60% by weight of the chewing gum center. Bulk sweeteners preferably include sugarless sweeteners and components. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, hydrogenated isomaltulose, and the like, alone or in combination.

High intensity sweeteners may also be present and are commonly used with sugarless sweeteners. When used, high intensity sweeteners typically constitute from about 0.001 to about 5% by weight of the chewing gum center, preferably from about 0.01 to about 1% by weight of the chewing gum center. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in the chewing gum center. The sweetener may also function in the chewing gum in whole or in part as a water soluble bulking agent. The softener may also provide additional sweetness.

The flavoring agent should generally be present in the chewing gum center in an amount within the range of from about 0.1 to about 15% by weight of the chewing gum center, preferably from about 0.2 to about 5% by weight of the chewing gum center, most preferably from about 0.5 to about 3% by weight of the chewing gum center. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the chewing gum center. Natural and artificial flavoring agents may be combined in any sensorially acceptable fashion.

Optional ingredients such as colors, emulsifiers, pharmaceutical agents and additional flavoring agents may also be included in chewing gum center.

The chewing gum center is generally manufactured by sequentially adding the various chewing gum ingredients to any commercially available mixer known in the art. After the ingredients have been thoroughly mixed, the gum mass is discharged from the mixer and shaped into the desired form such as by extruding into chunks, or casting into pellets.

Generally, the ingredients are mixed by first melting the gum base and adding it to the running mixer. The gum base may alternatively be melted in the mixer. Color and emulsifiers can be added at this time.

A softener such as liquid sorbitol solution can be added next along with syrup and part of the bulk portion. Further parts of the bulk portion may then be added to the mixer. The flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

After the chewing gum center has been manufactured and shaped, the xylitol and hydrogenated isomaltulose-containing coatings can be applied. The coating is initially present as a liquid syrup which contains from about 30 to about 80 or 85 weight percent of the coating ingredients previously described herein, and from about 15 or 20 to about 70 weight percent of a solvent such as water. In general, the hard coating process is carried out in a rotating pan. Sugarless gum center tablets to be coated are placed into the rotating pan to form a moving mass.

The material or syrup which will eventually form the hard coating, is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 200° F. Preferably, the syrup temperature is from about 150° F. to about 170° F. Most preferably, the syrup temperature should be maintained at about 158° F. throughout the process in order to prevent the hydrogenated isomaltulose in the syrup from crystallizing. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a dual composition hard coated chewing gum product containing about 10 to about 65 weight percent coating. Preferably, the final product will contain from about 20 to about 50 weight percent hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 80° to about 115° F. More preferably, the drying air is in the temperature range of from about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

A wide range of changes and modifications to the embodiments of the invention described above will be apparent to persons skilled in the art. For example, while the invention is described with respect to hard-coated chewing gum, it will be appreciated that the dual coating process is applicable to coating other food products, such as candies, in which a combined xylitol and hydrogenated isomaltulose coating would have utility.

The invention will now be illustrated with an Example. The example is not to be construed as imposing limitations on the invention, but is included to illustrate preferred embodiments.

EXAMPLE

Chewing gum centers of the formulation given below were mixed, sheeted and pelletized into standard 1.1 gram pillow shaped pellets. The composition is expressed as percent by weight of the chewing gum centers.

| COMPONENT | |
|---|---|
| Gum Base | 33.0% |
| Sorbitol | 38.6 |
| Calcium Carbonate | 13.0 |
| Glycerin | 5.0 |
| Coevaporated glycerin/Lycasin* | 8.4 |
| Peppermint Flavor | 1.8 |
| Encapsulated Aspartame | 0.2 |
| TOTAL | 100.0% |

*Lycasin is a trademark for hydrogenated starch hydrolyzates. The coevaporated glycerin/Lycasin contained about 67.5% Lycasin hydrogenated starch hydrolyzate solids, about 25% glycerin, and about 7.5% water, by weight.

About 1000 grams (about 900 pieces) were coated in a 12 inch coating pan. First about 15 applications of a 75% xylitol syrup were used to coat the gum, to give a product containing about 85% soft gum center and 15% xylitol coating, by weight of the intermediate product. Then about 15 additional applications of a 66% hydrogenated isomaltulose syrup were used to coat the gum, to give a product containing about 70% soft gum center and 30% xylitol and hydrogenated isomaltulose coatings, by weight of the finished product. The finished product had a good quality coating, based on sensory qualities and mouth feel, and had improved crunchiness (more than expected). Although the shelf life of the products was not tested, the finished product was believed to have an improved shelf life as a result of the coating process used, as compared to other hard-coated chewing gum pellets having coatings according to the prior art processes.

We claim:

1. A dual composition hard coated chewing gum, comprising:
   from about 35 to about 90 weight percent of a gum center, including a bulk portion, a chewing gum base and one or more flavoring agents; and
   from about 10 to about 65 weight percent of an outer coating containing from about 50 to about 100%, by weight, of xylitol and hydrogenated isomaltulose, including
   (a) an inner coating component which includes from about 50 to about 100%, by weight, of xylitol, and
   (b) an outer coating component which includes from about 50 to about 100%, by weight of hydrogenated isomaltulose.

2. A dual composition hard coated chewing gum, comprising:
   from about 35 to about 90 weight percent of a gum center, including a bulk portion, a chewing gum base and one or more flavoring agents; and
   from about 10 to about 65 weight percent of an outer coating containing from about 50 to about 100%, by weight, of xylitol and hydrogenated isomaltulose, which comprises at least two sequential layers of from about 50 to about 100%, by weight, of xylitol and from about 50 to about 100%, by weight, of hydrogenated isomaltulose.

3. The dual composition hard coated chewing gum of claim 1 or claim 2, wherein the gum base includes an elastomer selected from the group consisting of polyisobutylene, isobutylene-isoprene copolymer, styrene butadiene rubber, natural latexes, and combinations thereof.

4. The dual composition hard coated chewing gum of claim 1 or claim 2, wherein the gum base includes a resin selected from the group consisting of polyvinyl acetate, terpene resins, ester gums, and combinations thereof.

5. The dual composition hard coated chewing gum of claim 1 or claim 2, wherein the gum base includes fats and oils selected from the group consisting of animal fats, vegetable oils, hydrogenated vegetable oils, partially hydrogenated vegetable oils, cocoa butter, and combinations thereof.

6. The dual composition hard coated chewing gum of claim 1 or claim 2, wherein the gum base includes a wax selected from the group consisting of paraffin wax, microcrystalline wax, candelilla, carnauba, polyethylene wax, and combinations thereof.

7. The dual composition hard coated chewing gum of claim 1 or claim 2, wherein the gum base includes a filler component selected from the group consisting of calcium carbonate, magnesium carbonate, talc, dicalcium phosphate, and combinations thereof.

8. The dual composition hard coated chewing gum of claim 1 or claim 2, wherein the gum base includes a softener selected from the group consisting of glycerol monostearate, glycerol triacetate, and combinations thereof.

9. The dual composition hard coated chewing gum of claim 1 or claim 2, wherein layers of the hard outer coating include from about 50 to about 100% xylitol, by weight.

10. The dual composition hard coated chewing gum of claim 1 or claim 2, wherein layers of the hard outer coating include from about 50 to about 100% hydrogenated isomaltulose, by weight.

11. The dual composition hard coated chewing gum of claim 1 or claim 2, wherein layers of the hard outer coating include at least about 90% xylitol, by weight.

12. The dual composition hard coated chewing gum of claim 1 or claim 2, wherein layers of the hard outer coating include at least about 90% hydrogenated isomaltulose, by weight.

13. A dual composition hard coated chewing gum, comprising:

from about 35 to about 90 weight percent of a gum center, including a bulk portion, a chewing gum base and one or more flavoring agents; and from about 10 to about 65 weight percent of a dual composition hard outer coating which includes sequentially added layers, each layer comprising
(a) from about 50 to about 100% xylitol by weight; or
(b) from about 50 to about 100% hydrogenated isomaltulose by weight.

14. The dual composition hard coated chewing gum of claim 13, wherein the bulk portion includes a sugarless sweetener selected from the group consisting of sorbitol, mannitol, xylitol, hydrogenated starch hydrolysates, maltitol, hydrogenated isomaltulose, and combinations thereof.

15. The dual composition hard coated chewing gum of claim 13, wherein the bulk portion includes a high intensity sweetener selected from the group consisting of sucralose, aspartame, salts of acesulfame, alitame, saccharin and its salts, cyclamic acid and its salts, glycyrrhizin, dihydrochalcones, thaumatin, monellin, and combinations thereof.

16. The dual composition hard coated chewing gum of claim 13, wherein the gum center constitutes from about 50 to about 80 weight percent of the dual composition hard coated chewing gum and the outer coating constitutes from about 20 to about 50 weight percent of the dual composition hard coated chewing gum.

17. The dual composition hard coated chewing gum of claim 13, wherein layers of the hard outer coating include at least about 90% xylitol, by weight.

18. The dual composition hard coated chewing gum of claim 13, wherein layers of the hard outer coating include at least about 90% hydrogenated isomaltulose, by weight.

19. A method of forming a dual composition hard coated chewing gum, comprising the steps of:
(1) forming a gum center including a bulk portion, a chewing gum base portion, and one or more flavoring agents;
(2) forming a xylitol liquid coating syrup comprising solvent and from about 50 to about 85% xylitol, by weight of the xylitol liquid coating syrup;
(3) applying a plurality of coats of the xylitol liquid coating syrup to the gum center; and
(4) forming a hydrogenated isomaltulose liquid coating syrup comprising solvent and from about 50 to about 80% hydrogenated isomaltulose, by weight of the hydrogenated isomaltulose liquid coating syrup;
(5) applying a plurality of coats of the hydrogenated isomaltulose liquid coating syrup to the xylitol-coated gum center; and
(6) evaporating the solvent from each coat of the xylitol and hydrogenated isomaltulose liquid coating syrups, prior to applying the next coat;
the number of coats applied in steps (3) and (5) being sufficient to provide a coating constituting of from about 10 to about 65 weight percent of the total coated chewing gum product.

20. The method of claim 19, wherein the xylitol liquid coating syrup comprises at least about 30% xylitol, by weight of the xylitol liquid coating syrup.

21. The method of claim 19, wherein the hydrogenated isomaltulose liquid coating syrup comprises at least about 30% hydrogenated isomaltulose, by weight of the hydrogenated isomaltulose liquid coating syrup.

22. The method of claim 19, wherein the liquid coating syrup further comprises a flavoring agent.

23. The method of claim 19, wherein the liquid coating syrup further comprises a whitener.

24. The method of claim 19, wherein the liquid coating syrup further comprises an artificial sweetener.

25. The method of claim 19, wherein the liquid coating syrup is applied to the chewing gum center by spraying.

26. The method of claim 19, wherein the layers of xylitol coating are applied before the layers of hydrogenated isomaltulose coating.

27. The method of claim 19, wherein the solvent for the liquid coating syrup comprises water.

* * * * *

UNITED STATES PATENT AND TRADEMARK OFFICE
CERTIFICATE OF CORRECTION

PATENT NO. : 5,270,061
DATED : December 14, 1993
INVENTOR(S) : Michael A. Reed et al.

It is certified that error appears in the above-identified patent and that said Letters Patent is hereby corrected as shown below:

On the title page, item [56] References Cited:
    Under the heading "FOREIGN PATENT DOCUMENTS", in the first line, delete "24596" and substitute --24596/88--.
Column 11:
    Claim 13, line 4, delete ", including" and substitute --which includes a gum base,--;
              lines 4-5, delete "a chewing gum base".

Signed and Sealed this

Eleventh Day of October, 1994

Attest:

BRUCE LEHMAN

Attesting Officer      Commissioner of Patents and Trademarks